Aug. 21, 1945. T. K. ODEN ET AL 2,383,073
FISHHOOK
Filed June 1, 1944
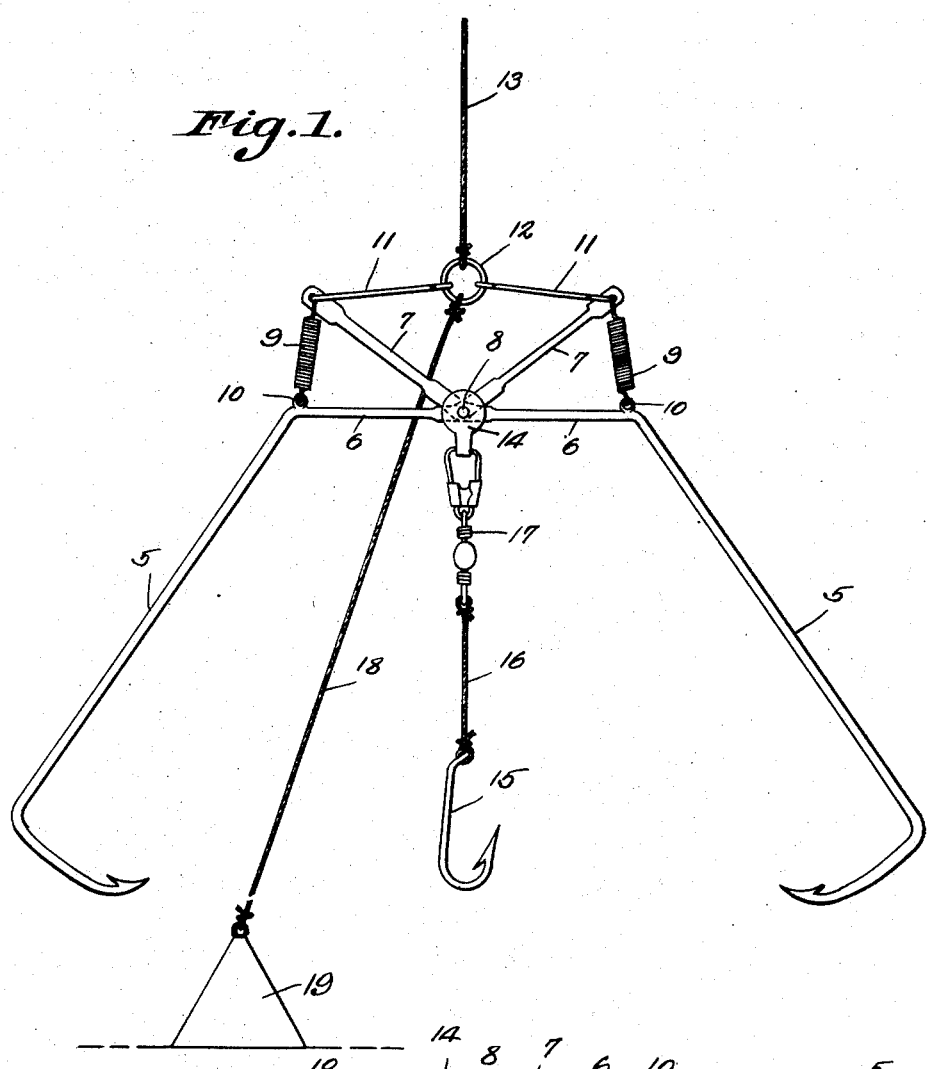
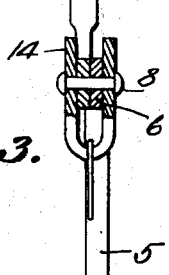
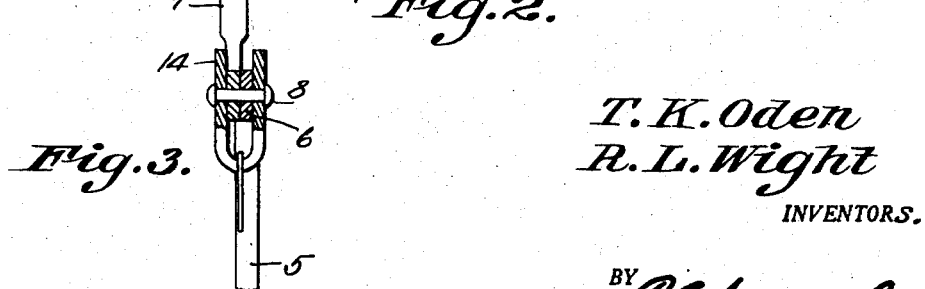
T. K. Oden
R. L. Wight
INVENTORS.
BY
ATTORNEYS.

Patented Aug. 21, 1945

2,383,073

UNITED STATES PATENT OFFICE 2,383,073

FISHHOOK

Thomas K. Oden and Ralph L. Wight, Sacramento, Calif.

Application June 1, 1944, Serial No. 538,228

1 Claim. (Cl. 43—37)

This invention relates to fish hooks, and more particularly to fish hooks designed primarily for catching game fish.

The primary object of the invention is to provide a pair of pivoted gaffs used in conjunction with a fish hook, the gaffs being actuated by a pull on the fishing line to which the hook is connected, for driving the gaffs into the fish to prevent the fish from escaping, should the hook break or the hook pull through the mouth of the fish.

With the foregoing and other objects in view which will appear as the description proceeds, the invention consists of certain novel details of construction and combinations of parts hereinafter more fully described and pointed out in the claim, it being understood that changes may be made in the construction and arrangement of parts without departing from the spirit of the invention as claimed.

Referring to the drawing:

Figure 1 is an elevational view of a hook constructed in accordance with the present invention, the gaffs being shown in their open positions.

Figure 2 is a transverse sectional view through the upper portion of the hook.

Figure 3 is a sectional view taken on line 3—3 of Fig. 1.

Referring to the drawing in detail, the hook comprises a pair of pivotally connected gaffs indicated by the reference character 5. Each gaff 5 is formed with an arm 6 extended at an oblique angle with respect to the main portion of the gaff, and the arm 6 is formed with upwardly inclined end portions 7.

The arms 6 of the gaffs are pivotally connected at 8, and as shown, the arms 6 are wide at their points of connection, to add rigidity to the arms and insure against the arms breaking under severe strains.

The upwardly inclined portions 7 of the arms are of lengths so that the free ends thereof overlie the upper ends of the main portions of the gaffs, where they are connected with the adjacent gaff, by means of coiled springs 9. These springs 9 are of the contractile type and normally tend to hold the gaffs 5 in their open positions, or in the positions shown by Fig. 1 of the drawing.

The springs 9 have one of their respective ends extended through the ring member 10 associated therewith. These ring members 10 are welded to the gaffs so that they will be in direct line with the ends of the upwardly inclined portions 7. The opposite ends of the springs are positioned in openings formed in the upwardly inclined portions, as shown by Fig. 1.

Links indicated by the reference character 11 are also connected with the upwardly inclined portions 7 and have connection with the line ring 12, to which the fishing line 13 is connected.

Secured to the arms 6, by means of the pivot 8, is a yoke 14 that provides the connection between the fish hook 15 and gaffs, the fish hook 15 being shown as connected with the yoke 14 through the line 16 and connecting member 17, which is in the form of a swivel.

The weight line 18, is also connected with the line ring 12, and is connected with the weight 19 for holding the bait-carrying hook and gaffs below the surface of the water.

From the foregoing it will be seen that due to the construction shown and described, when a fish takes the bait and hook 15, the sudden pull will result in the upwardly inclined portions 7 of the arms 6, being drawn towards each other, the hook ends of the gaffs being thrown into the fish at the gills. The fish will be securely held by the gaffs which may only be released by manually removing the gaffs from the fish.

What is claimed is:

A fishing device comprising a pair of gaffs, arms formed at the upper ends of the gaffs, said arms having upwardly inclined end portions, the upwardly inclined end portion of one arm overlying the arm of the adjacent gaff in spaced relation therewith, coiled springs connecting the free ends of the upwardly inclined ends of the arms with the adjacent lower arms, normally holding the gaffs open, a bait hook secured between the gaffs, and means for connecting a line to said gaffs, and said gaffs being adapted to embed themselves in a fish caught on the bait hook, when the bait hook and line are pulled in opposite directions.

THOMAS K. ODEN.
RALPH L. WIGHT.